United States Patent [19]

Colles et al.

[11] Patent Number: 5,031,980
[45] Date of Patent: Jul. 16, 1991

[54] FLEXIBLE GUIDES FOR LIGHT ENERGY

[75] Inventors: Michael J. Colles; Anthony O'Hara; John MacLeod, all of Edinburgh, Great Britain

[73] Assignee: Heriot-Watt Univ. of Riccarton, Edinburgh, Great Britain

[21] Appl. No.: 444,527

[22] Filed: Dec. 1, 1989

[30] Foreign Application Priority Data

Dec. 3, 1988 [GB] United Kingdom ............... 8828278

[51] Int. Cl.$^5$ ................................................ G02B 6/10
[52] U.S. Cl. ................................... 350/96.3; 350/96.1; 350/96.26
[58] Field of Search ................ 350/96.1, 96.24, 96.26, 350/96.3; 128/4-8

[56] References Cited

U.S. PATENT DOCUMENTS

| 2,932,294 | 4/1960 | Fourestier et al. | 350/96.26 |
| 3,995,934 | 12/1976 | Nath | 350/96.26 |
| 4,754,328 | 6/1988 | Barath et al. | 350/96.26 X |
| 4,761,054 | 8/1988 | Ishimori et al. | 350/96.26 |
| 4,929,052 | 5/1990 | Colles et al. | 350/96.32 |

Primary Examiner—Frank Gonzalez
Assistant Examiner—John Ngo
Attorney, Agent, or Firm—Ratner & Prestia

[57] ABSTRACT

A waveguide (10) comprises first and second light guides (12, 18) which transmit light at different wavelengths. The second light guide (18) is disposed in a tortuous path on the exterior of the first light guide (12) and preferably the tortuous path is a helix. The second light guide (18) emits light at an angle to the light emitted from the first light guide (12) and typically the light from the first light guide is emitted axially. The light from the first light guide is emitted at an angle by means of an angled refracting face (42) on the end of the second light guide (18) or by securing the end of the second light guide (18) to a conical end portion (28) of the first light guide (12).

3 Claims, 3 Drawing Sheets

FLEXIBLE GUIDES FOR LIGHT ENERGY

This invention relates to flexible guides for light energy in both the infra-red and visible bands.

BACKGROUND OF THE INVENTION

The invention is an improvement in or modification of the invention described in our Published European Application No. 0,329,353 ("the prior application"), which describes a flexible guide suitable for coupling infra-red radiation of 10.6 micrometer wavelength from a carbon dioxide laser to a site of use for surgical cutting.

The apparatus described in the prior applicaiton is an efficient transmitter of infra-red radiation, but has been found not to be such a good transmitter of visible light.

One object of the present invention is to provide an improvement in or modification of the prior application which allows visible light to be transmitted efficiently to the remote end of the guide.

It is also an object of the present invention to provide a means whereby the spacing between the remote end of the guide and a surface being operated upon may be accurately judged.

SUMMARY OF THE INVENTION

Accordingly, the present invention provides a waveguide comprising first and second light guides for transmitting light at first and second wavelengths respectively from respective sources of light to a remote location, and wherein the first wavelength is substantially invisible; the ends of the light guides at the remote location being arranged so that the light beam emitted from the second light guide defines the position of impingement of the light beam emitted from the first light guide on a surface spaced from the remote location.

Typically, the second wavelength is visible light so that the position of impingement of the light beam from the first guide is visible to an operator. However, alternatively the second wavelength could be invisible light which reacts with the surface so that the surface and emits visible light so that the position of impingement of the light emitted by the first light guide is visible to an operator. Typically, in this alternative example the second wavelength is ultra-violet light and the surface fluoresces to emit visible light from the surface.

Preferably, the first light guide is a flexible guide according to the prior application, for transmission of infra-red energy, and the second light guide comprises an optical fibre disposed in a tortuous path on the exterior of the first light guide, for transmission of visible light. The first and second light guides may suitably be enclosed in an outer sheath, for example of heat-shrink plastics material.

Typically, the visible light from the second light guide is emitted from the second light guide at an angle to the infra-red energy emitted from the first light guide, and preferably, the infra-red energy is projected from the end of the waveguide in an axial beam, and the visible light is projected at an angle thereto. The visible light may be so projected by provision of an angled refracting face on the end of the optical fibre, or by securing the end of the optical fibre to a tapered end portion of said flexible guide.

Preferably also, means are provided for causing the visible light to be projected as a diverging ring of light. Said means may comprise means for directing the visible light from said source into the optical fibre at an angle, or an annulus of optically transmissive material positioned around the exit of said flexible infra-red guide.

The infra-red energy is preferably of 10.6 micrometer wavelength, and may suitably be generated by a carbon dioxide laser. The visible light is preferably derived from a helium-neon laser.

BRIEF DESCRIPTION OF THE DRAWINGS

Embodiments of the invention will now be described, by way of example only, with reference to the drawings, in which.

DESCRIPTION OF PREFERRED EMBODIMENTS

Figure 1:
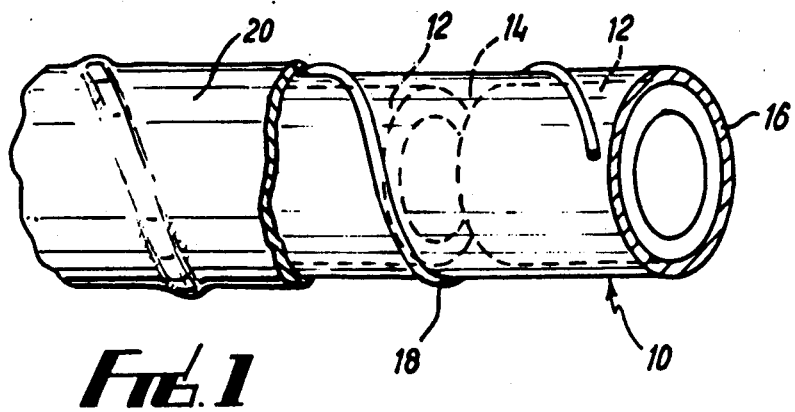
FIG. 1 is a perspective view, partly in section and partly broken away, illustrating the general arrangement of embodiments of the invention.

Referring to FIG. 1, a flexible waveguide 10 for infra-red radiation comprises a series of alumina tubes 12 spaced apart by axial gaps 14 and held within a flexible plastics sleeve 16. As detailed more fully in the prior application, the waveguide in a preferred form is used for transmitting energy of 10.6 micrometer wavelength produced by a CO2 laser, the tubes 12 having a bore of about 1 mm and a length of about 5 mm.

In the waveguide of the present invention, a second transmission path for light energy is provided. In the present embodiment, an optical fibre 18 suitable for transmitting visible light is arranged in a helical path around the sleeve 16. The fibre 18 preferably transmits visible light produced by a helium-neon laser, and comprises (as is well known per se) a silica core surrounded by a silica cladding of lesser refractive index, the cladding in turn being surrounded by a buffer, suitably of high temperature resistant polyamide.

The assembly of waveguide 10, sleeve 16 and fibre 18 is enclosed in an outer covering 20 of heat-shrink plastics material.

Figure 2:
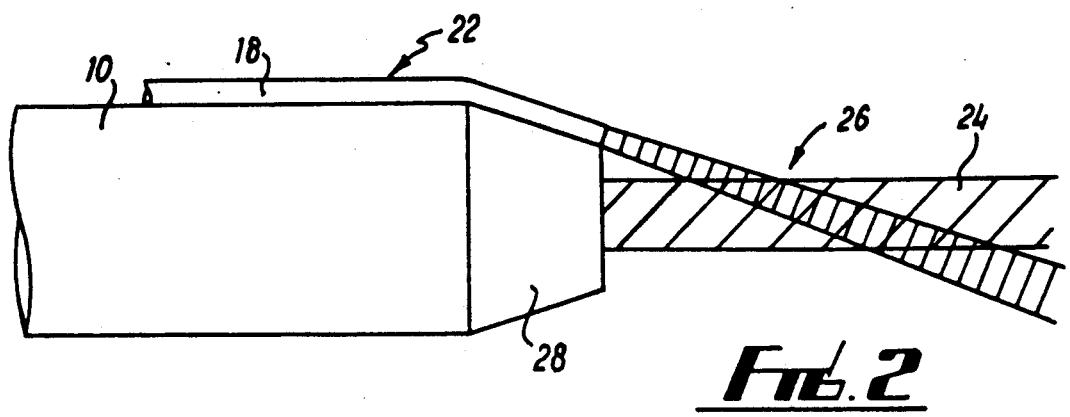
FIG. 2 is a schematic side view of one embodiment of the invention.

FIG. 2 shows the end 22 of the assembly remote from the light sources. The infra-red energy is emitted from the waveguide 10 as a narrow beam 24 suitable for surgical cutting. The fibre 18 is arranged, as will be described, such that the visible light is emitted at an angle to the beam 24 to intercept the latter in an area indicated at 26. This assists the surgeon in maintaining the tip of the waveguide at a desired small distance from the tissues being cut.

Figure 3:
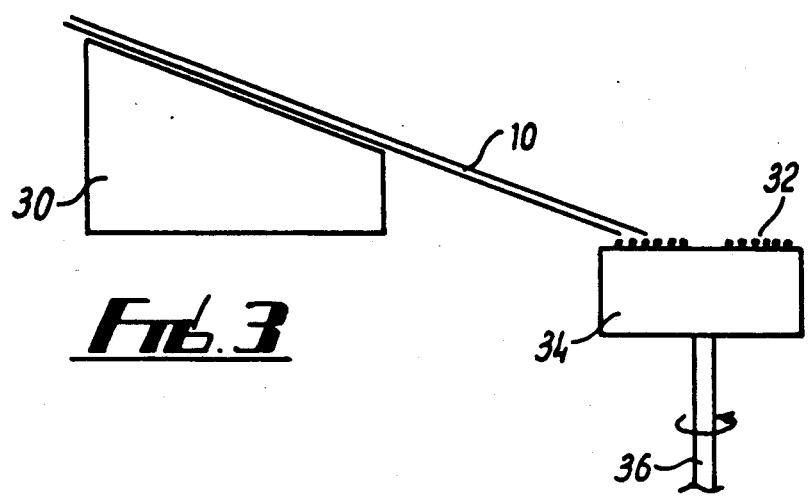
FIGS. 3 and 4 illustrate methods of forming the embodiment of FIG. 2.
Figure 4:
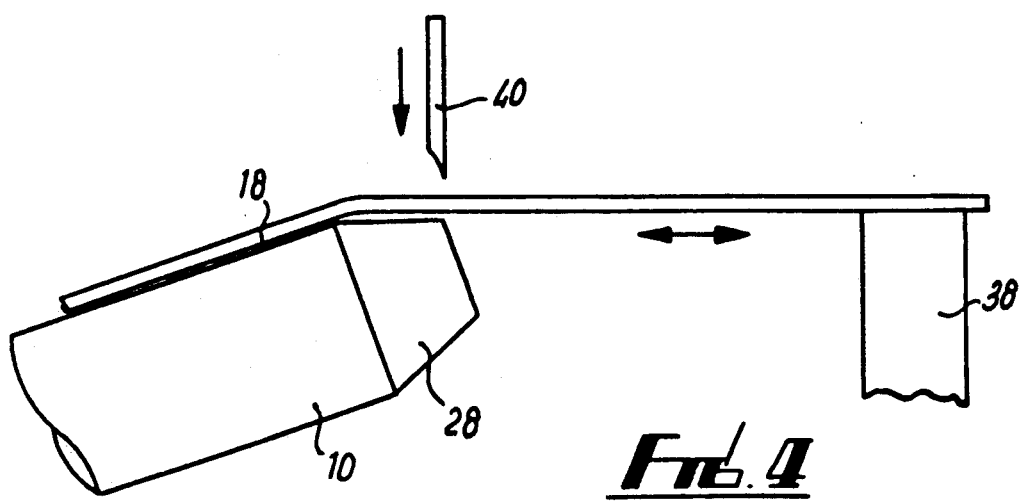
Figure 5:
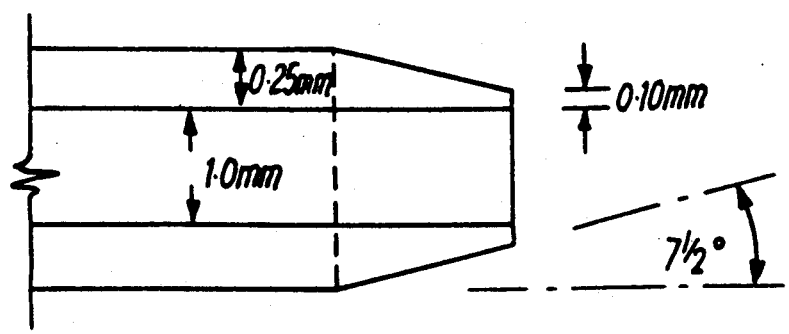
FIG. 5 illustrates preferred dimensions for the embodiment of FIG. 2.

As shown in FIG. 2, one suitable means of achieving this coincidence is to form the end of the sleeve 16 as a conical surface 28. This may be achieved as shown in FIG. 3, the waveguide 10 being positioned on a preset support 30 and the surface 28 formed by abrading with diamond particles 32 on a flat copper head 34 rotated on a spindle 36. The visible light fibre 18 is then secured to the conical surface 28. To obtain an accurate exit face, the fibre 18 is stretched between the waveguide 10 and a support 38, as in FIG. 4, and struck with a cleaving tool 40. This produces a score in the surface of the silica fibre, and the break is completed by the tensile force, to give an exit face square to the cone angle of the surface 28. FIG. 5 shows typical dimensions, which will place the area of coincidence 26 at 5 mm from the end face of the waveguide.

Figure 6:
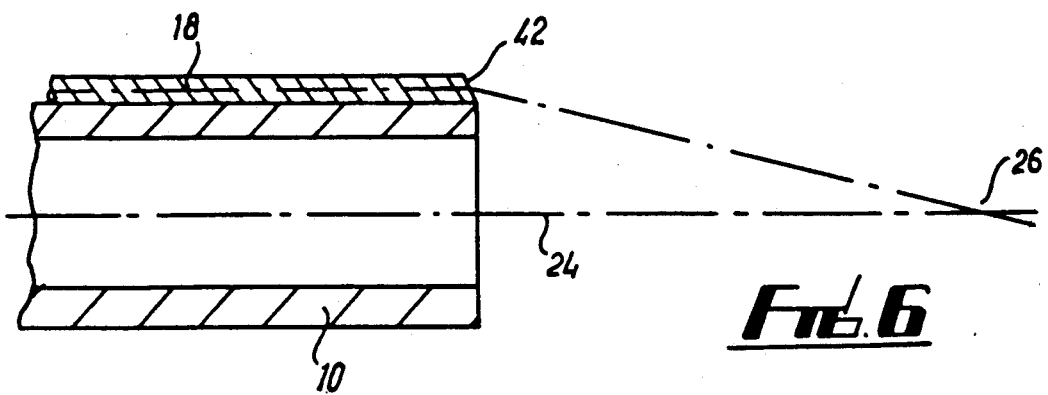
FIG. 6 is a schematic side view of a second embodiment.

FIG. 6 shows a possible alternative, in which the end of the waveguide 10 is left parallel, and the fibre 19 has an end face 42 cut and polished at an angle to act as a prism refracting the visible light beam towards the axis of the infra-red beam. The embodiment of FIGS. 1–5 is, however, preferred as being more practical to manufacture.

Figure 7:
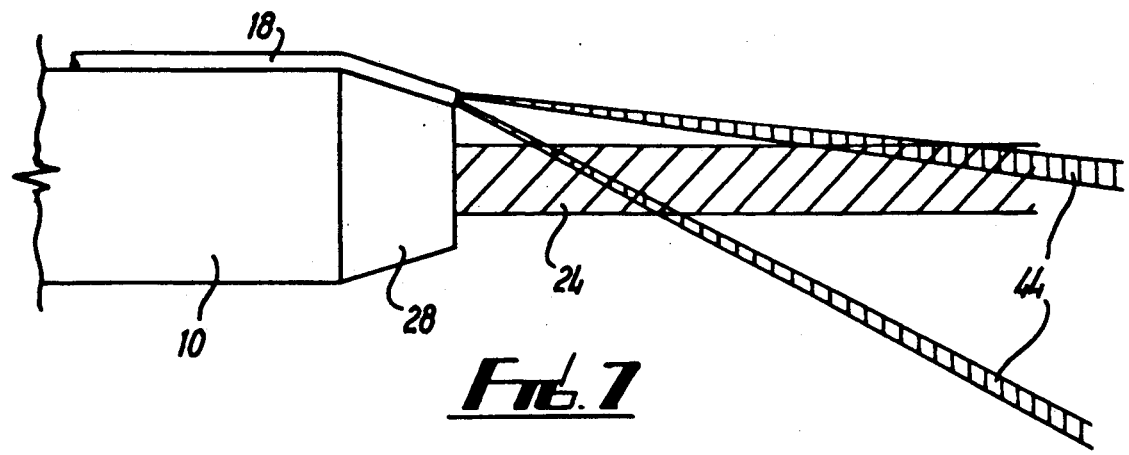
FIG. 7 is a schematic side view illustrating a further embodiment.

FIG. 7 is a view similar to FIG. 2, and shows a modification in which the fibre 18 emits diverging ring of visible light, as indicated at 44. It has been found that a ring of visible light on the operating site, rather than a light spot, is more readily usable by the surgeon; in particular, it it more easy to judge the size of a ring than the size of a spot. The angles involved may be chosen such that the infra-red beam 24 will be positioned within the visible light ring 44 over the range of most usual spacing between the waveguide 10 and the operating site.

Figure 8:
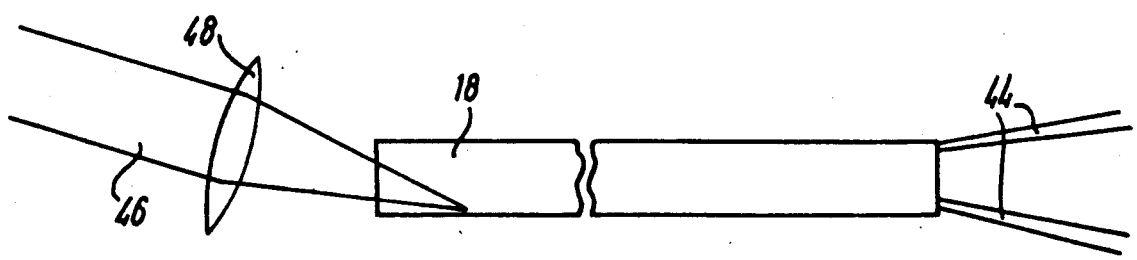
FIG. 8 shows the method of supplying visible light to the embodiment of FIG. 7.

The diverging ring 44 is produced as illustrated in FIG. 8. A beam of visible laser light 46 is focused by lens system 48 to be incident at an angle on the entry face of fibre 18. The angle of incidence required to produce a desired exit angle can be established empirically.

Figure 9:
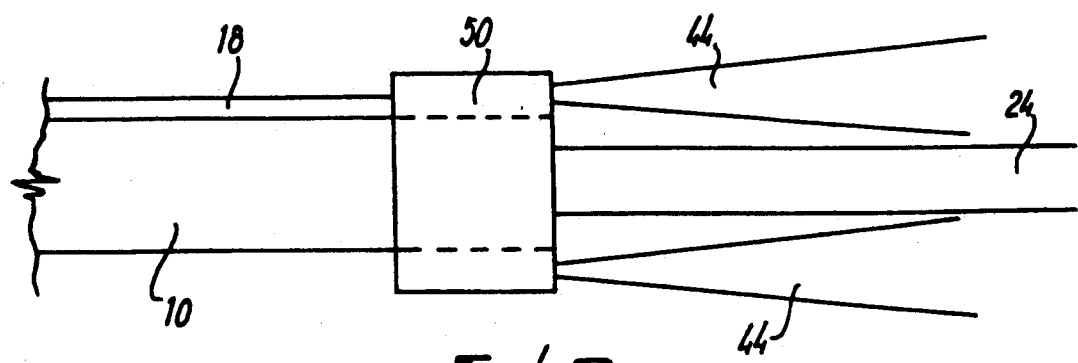
FIG. 9 is a schematic side view of another embodiment.

An alternative means of producing a ring of visible light is shown in FIG. 9. The fibre 18 terminates against the surface of a glass annulus 50. The visible light undergoes scattering and spreading by internal reflection within the annulus 50, and exits as a diverging ring coaxial with the infra-red beam 24.

Modifications may be made to the foregoing embodiments within the scope of the invention. Although a helical path is preferred for the visible ligth fibre, other tortuous paths may be used, for example a serpentine path. More than one visible light fibre may be provided, each following a tortuous path to provide the assembly with flexibility. The visible light source may be a semiconductor laser rather than a He-Ne laser; alternatively a single laserr with a mixture of $CO_2$ and He-Ne may be used (such lasers being known per se), and the visible light split out from the infra-red beam by a frequency-dependent connector.

We claim:

1. A waveguide comprising first and second light guides for transmitting light at first and second wavelengths respectively from respective sources of light to a remote location, and wherein the first wavelength is substantially invisible; the ends of the light guides at the remote location being arranged so that the light beam emitted from the second light guide defines the position of impingement of the light beam emitted from the first light guide on a surface spaced from the remote location, the waveguide further comprising means for causing the light from the second light guide to be emitted as a diverging ring of light.

2. A waveguide according to claim 1, wherein the means comprises means for directing the light for the second light guide from the source into the second light guide at an angle.

3. A waveguide according to claim 1, wherein the means comprises an annulus of optically transmissive material positioned around the exit of the second light guide.

* * * * *